(No Model.)
W. KORTÜM.
APPARATUS FOR STERILIZING MILK.
No. 557,993. Patented Apr. 7, 1896.
Fig. I.
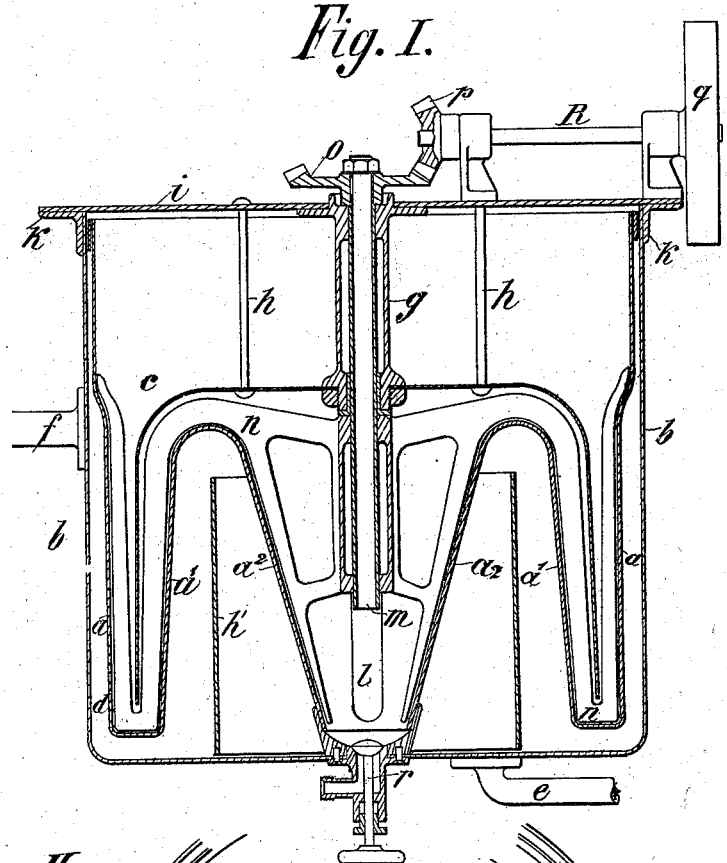
Fig. II.
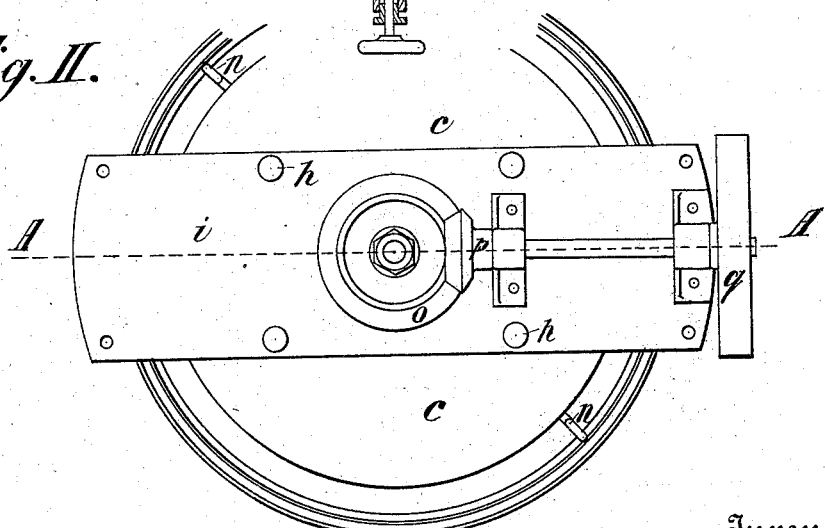
Witnesses
Geo. H. Mayer
James D. Latimer
Inventor
Wilhelm Kortüm
By his Attorney
J. B. Schaeffer

UNITED STATES PATENT OFFICE.

WILHELM KORTÜM, OF BERLIN, GERMANY, ASSIGNOR TO EMIL WILHELM REINHARDT VON BÜHLER, OF SAME PLACE.

APPARATUS FOR STERILIZING MILK.

SPECIFICATION forming part of Letters Patent No. 557,993, dated April 7, 1896.

Application filed June 21, 1895. Serial No. 553,582. (No model.)

*To all whom it may concern:*

Be it known that I, WILHELM KORTÜM, of Berlin, in the Kingdom of Prussia, Empire of Germany, have invented a new and useful Improvement in Apparatus for Sterilizing Milk or other Liquids, of which the following is a specification, reference being made to the accompanying drawings, in which—

Figure I is a longitudinal vertical section of the apparatus in the line A A of Fig. II. Fig. II is a plan view of the apparatus.

Similar letters refer to similar parts throughout both views.

The object of my invention is to provide apparatus and means for giving the liquid to be sterilized a vertical and centrifugal motion, and at the same time apply to the liquid sufficient heat to destroy the germs. I attain this object by means of the apparatus shown in the drawings, to wit:

I make a cylindrical outside vessel $b$, of suitable material, which is open on top. Within this outside vessel $b$ at convenient fixed distances I make partitions having heating-surface $a$, $a'$, and $a^2$, which is a depressed bell-shaped cavity. Between the heating-surface partitions $a$ $a'$ $a^2$ and the outside vessel $b$ is a space $d$, which is filled with the heating medium, as steam or hot water, admitted through the pipe $e$ and drawn off by the pipe $f$. The heating medium is forced by a cylinder $h'$, that is open on top and bottom, to strike the two inside conical heating-surfaces $a'$ and $a^2$ before it passes out at $f$. The bell-shaped bonnet $c$, which reaches down into the heating-surfaces $a$ and $a'$, is connected by the sleeves $g$ and the stay-bolts $h$ to the cross-piece $i$, carrying the driving-gear $o$, $p$, $q$, and R, and connected to the cylindrical vessel $b$ by the angle-irons $k$.

The bell-shaped bonnet C, which reaches down into the compartment formed by the partitions $a$ and $a'$, divides this compartment so that the milk or other liquid which is admitted into the top of the apparatus flows over the top of this bonnet and is obliged to flow down the sides on the outside of the bonnet $c$ and up on the inside over the heating-surface of partition $a'$, thereby causing a circulation of the liquid over the heating-surfaces of the partitions $a$ and $a'$, and, as will be seen, is a very important feature of the apparatus.

Within the sleeves $g$ is a hollow shaft $m$, provided at the bottom with a cup $l$ and connected with the blades $n$ and the rotating gear $o$, $p$, $q$, and R. The blades $n$ sweep along in the channel between the inner and outer sides of the shell of the bell-shaped bonnet $c$ and bring the milk in connection with the heating-surfaces $a$ $a'$ $a^2$, and at the same time keep it in motion and prevent scorching.

$o$ and $p$ are beveled cog-wheels driven by the pulley $q$ and the shaft R. The pulley $q$ is driven by a suitable power.

The power is applied to drive the stirring-blade $n$.

The valve $r$ is provided to regulate the flow of the sterilized liquid from the bell-shaped bonnet $c$.

To ascertain the temperature, a thermometer can be introduced into the cup $l$ through the hollow shaft $m$.

Having described the parts of my invention, I now proceed to explain the method of operating the same.

The milk or other liquids to be sterilized, which enter the apparatus on the top, flow downward between the heating-surface $a$ and the outside surface of the bonnet $c$ and run between the inside surface of the bonnet $c$ and the heating-surface $a'$ and then pass in a downward direction toward the valve $r$, while at the same time the heat is applied through the pipe $e$ and flows in an opposite direction through $f$.

I do not confine the use of this apparatus for sterilizing milk alone. It is applicable to any liquids.

I am aware that different kinds and forms of apparatus have been devised for the sterilizing of milk, and I do not therefore claim the broad principle of sterilizing milk or other liquids; but What I do claim, and desire to secure by Letters Patent, is—

1. An apparatus for sterilizing milk or other liquids consisting of a cylindrical vessel $b$, with concentric cylindrical partitions $a$, $a'$, and conically-shaped partition $a^2$, partition $a$, being secured to vessel $b$, at the top and attached to partition $a'$, at the bottom, and $a^2$ being attached to $a'$ at the top and secured to the valve-housing cup $r$ at the bottom; the bell-shaped bonnet $c$, connected to cross-piece $i$ by the sleeve $g$ and stay-bolts $h$; the cylinder $h'$, stirring-blades $n, n$, which sweep the heating-surface of partitions $a$ $a'$ and $a^2$ and the inner and outer sides of the bonnet $c$, attached to the hollow shaft $m$, as and for the purpose set forth.

2. An apparatus for sterilizing milk and other liquids consisting of an outside vessel $b$, heating-surface partitions, $a$, $a'$ and $a^2$, bell-shaped bonnet $c$, the cylinder $h'$, stirring-blades $n, n$ with driving-gear $o, p, q$ and R, the hollow shaft $m$, and the heating-medium supply-pipe $e$, with discharge-pipe $f$, as and for the purpose set forth.

In witness whereof I have hereunto signed my name in the presence of two subscribing witnesses.

WILHELM KORTÜM.

Witnesses:
   CHAS. II. DAY,
   WM. HAUPT.